United States Patent

Ohto et al.

[11] Patent Number: 5,993,044
[45] Date of Patent: Nov. 30, 1999

[54] APPARATUS FOR GENERATING TRAJECTORY FOR INDUSTRIAL ROBOT

[75] Inventors: Masahiro Ohto, Hirakata; Hisashi Kinoshita, Katano; Takashi Nakatsuka, Sanda; Yoshinori Nishida, Toyonaka, all of Japan

[73] Assignee: Matsushita Electric Industrial Co., Ltd., Japan

[21] Appl. No.: 08/916,574

[22] Filed: Aug. 22, 1997

[30] Foreign Application Priority Data

Aug. 28, 1996 [JP] Japan ................................ 8-226201

[51] Int. Cl.[6] ................................................ G06F 17/17
[52] U.S. Cl. ........................ 364/474.3; 364/167.09; 318/568.1; 219/124.34
[58] Field of Search ...................... 318/568.15, 568.13, 318/568.19, 573; 901/1, 3, 10; 395/97, 92, 80; 364/474.31, 474.3; 701/88, 99, 97, 87, 80, 92

[56] References Cited

U.S. PATENT DOCUMENTS

| | | | |
|---|---|---|---|
| 4,675,502 | 6/1987 | Haefner et al. | 219/124.34 |
| 4,807,153 | 2/1989 | Onaga et al. | 395/91 |
| 5,373,439 | 12/1994 | Jeon | 364/167.09 |
| 5,608,640 | 3/1997 | Itoh | 364/474.3 |

*Primary Examiner*—William Grant
*Assistant Examiner*—Chad Rapp
*Attorney, Agent, or Firm*—Parkhurst & Wendel, L.L.P.

[57] ABSTRACT

An acceleration generated when a tool tip of a robot moves straightly or turns a teaching point inward, is suppressed under a predetermined maximum acceleration so that the tool tip moves smoothly. From teaching point data including a moving instruction to specify a trajectory shape on the basis of a teaching point giving a reference based on which a tip portion of the robot moves, a moving speed instruction to specify a moving speed of the tip portion on the trajectory, and an allowable path error to specify a maximum value of an error between the teaching point and the trajectory, a realizable moving speed when the tip portion of the robot moves on the straight line trajectory is obtained, a deceleration rate with respect to the moving speed recorded in the teaching point data is obtained, a realizable moving speed when the tip portion of the robot passes the inside of the teaching point is obtained, a deceleration rate with respect to the moving speed recorded in the teaching point data is calculated, and those values are stored in the teaching point data. When the robot is operated, in accordance with the straight portion deceleration rate and the inward turning portion deceleration rate stored in the teaching point data, the moving speeds of the robot at the straight portion and the inward turning portion are reset.

9 Claims, 7 Drawing Sheets

FIG. 4

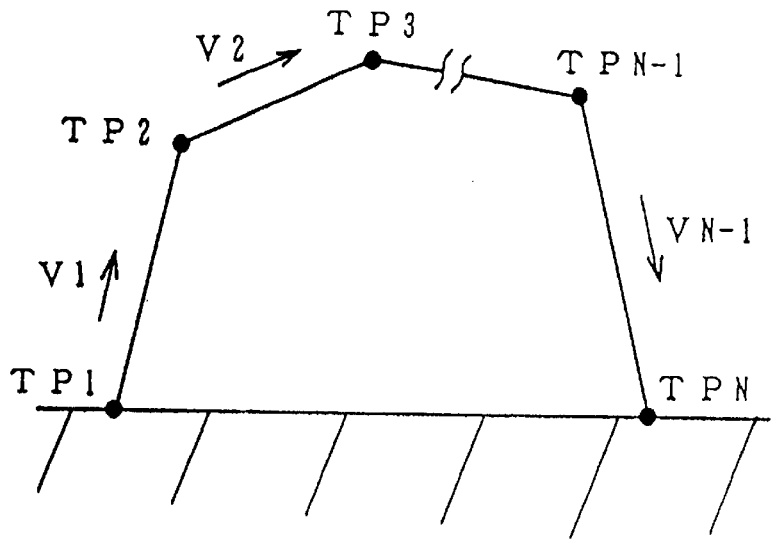

TEACHING POINT DATA $$= \begin{Bmatrix} \boxed{\text{POSITION DATA + MOVING SPEED V1 + etc.}} & TP1 \\ \boxed{\text{POSITION DATA + MOVING SPEED V2 + etc.}} & TP2 \\ \boxed{\text{POSITION DATA + MOVING SPEED V3 + etc.}} & TP3 \\ \cdots \\ \boxed{\text{POSITION DATA + MOVING SPEED VN-1 + etc.}} & TPN-1 \\ \boxed{\text{POSITION DATA + MOVING SPEED VN + etc.}} & TPN \end{Bmatrix}$$

CHANGED TEACHING POINT DATA $$= \begin{Bmatrix} \boxed{\text{POSITION DATA + MOVING SPEED V1 + etc.}} + \boxed{\varepsilon L1} & TPd1 \\ \boxed{\text{POSITION DATA + MOVING SPEED V2 + etc.}} + \boxed{\varepsilon L2} + \boxed{\varepsilon r2} & TPd2 \\ \boxed{\text{POSITION DATA + MOVING SPEED V3 + etc.}} + \boxed{\varepsilon L3} + \boxed{\varepsilon r3} & TPd3 \\ \cdots \\ \boxed{\text{POSITION DATA + MOVING SPEED VN-1 + etc.}} + \boxed{\varepsilon LN-1} + \boxed{\varepsilon rN-1} & TPdN-1 \\ \boxed{\text{POSITION DATA + MOVING SPEED VN + etc.}} & TPdN \end{Bmatrix}$$

APPARATUS FOR GENERATING TRAJECTORY FOR INDUSTRIAL ROBOT

FIELD OF THE INVENTION

The present invention relates to an apparatus for generating a trajectory for an industrial robot, which generates an objective trajectory by interpolation between inputted teaching points.

BACKGROUND OF THE INVENTION

In recent years, a robot is used in various working sites, and the smoothness and high speed of its operation are important.

A conventional apparatus for generating a trajectory for an industrial robot will be described below. A trajectory along which a robot passes to carry out a specified operation is determined in such a manner that an operator registers, in advance, a plurality of teaching points through which the robot must pass, and passing points between the teaching points are interpolated with straight lines, arcs or parabolas. In teaching point data that gives information on the teaching points, the position of a teaching point, the coordinates of an attitude, a speed at which the robot passes between the teaching points, and the like are specified. In the case where the robot is moved in a simple straight-line motion from one teaching point to a next teaching point, a straight line trajectory connecting the teaching points is obtained by interpolation arithmetic between the teaching points. In the case where the robot is moved in straight lines among three teaching points, when a bent angle of a polygonal line is large, the speed of a tip portion is largely changed at the node of the polygonal line, so that leading-edge oscillation is caused to occur. Also, since a large acceleration is applied to a joint axis of the robot when the tip portion passes through the bent point of the node of the polygonal line, the components of the robot, such as a reduction gear, are caused to bring shortening of lifetime, its destruction or the like.

In order to overcome these problems, Japanese Patent Publication No. 1-27443 or Japanese Patent Application Laid-Open No. 4-111006 discloses to provide means for generating a trajectory turning the inside of a node by connecting two lines constituting the polygonal line by a smooth curved line without passing through the bent point. Also, there is proposed a method of generating a trajectory for a robot in which the change of an angle of respective axes at a teaching point is made smooth, the operation time is shortened, and the error of a path at the teaching point is suppressed within a predetermined allowable error of a path.

However, even by the above means for operating the robot along the trajectory turning the inside of the bent point of the polygonal line, since moving speed is determined for every interpolated interval put between the teaching points, if the specified speeds are different between intervals before and behind a teaching point, discontinuous change of speed occurs so that oscillation is caused.

Also, according to an object of protecting mechanical parts of a robot or the contents of an operation to be carried out by a robot, there is a case where an acceleration value occurring at the operation is restricted. In this case, there is a possibility that the moving speed of a tool tip of a robot registered in the teaching point data can not be faithfully realized, so that it is required for an operator to set the speed again.

DISCLOSURE OF THE INVENTION

The present invention has been made to overcome the above problems, and an object of the invention is therefore to provide an apparatus for generating a trajectory for an industrial robot in which when a tool tip of a robot is directly moved, or is subjected to mixed movements of a straight movement and an inward turning movement, the generated acceleration is suppressed within a predetermined maximum acceleration so that the tool tip can smoothly move without generating an oscillation, and such setting can be automatically made.

According to a first aspect of the present invention, an apparatus for generating a trajectory for a robot, which receives teaching point data, as input, including a teaching point to give a reference of a trajectory on which a tip portion of the robot moves, a moving instruction to specify a trajectory shape on the basis of the teaching point, a moving speed specifying value to specify a speed at which the tip portion moves on the trajectory, and an allowable path error to specify a maximum value of an error between the teaching point and the trajectory, said apparatus comprising:

straight portion deceleration rate setting means for obtaining a realizable moving speed when the tip portion of the robot moves on a straight line trajectory, and calculating a deceleration rate with respect to the moving speed specifying value recorded in the teaching point data before the robot is actually operated, such as a teaching time of the robot or an editing time of existing teaching data;

inward turning portion deceleration rate setting means for obtaining a realizable moving speed when the tip portion of the robot passes an inside of the teaching point, and calculating a deceleration rate with respect to the moving speed specifying value recorded in the teaching point data before the robot is actually operated, such as the teaching time of the robot or the editing time of the existing teaching point data;

deceleration rate storage means for storing the straight portion deceleration rate set by the straight portion setting means and the inward turning portion deceleration rate set by the inward turning portion deceleration rate setting means into the teaching point data before the robot is actually operated, such as the teaching time of the robot or the editing time of the existing teaching point data;

moving speed resetting means for resetting moving speeds of the robot at a straight portion and an inward turning portion in accordance with the straight portion deceleration rate and the inward turning portion deceleration rate stored in the teaching point data when the robot is operated;

interpolation arithmetic means for executing interpolation arithmetic to a path specified by the teaching point data in accordance with the specified trajectory shape and the reset moving speeds, and outputting an angle change waveform of respective joint axes to operate the robot; and continuing means for smoothing an angle change of the respective joint axes of the robot when the tip portion passes through the teaching point, and generating a continuous curved line trajectory passing the inside of the teaching point in accordance with the allowable path error.

According to the first aspect of the present invention, before the robot is operated, the realizable moving speed when the tip portion of the robot moves on the straight line trajectory is obtained, the deceleration rate with respect to the moving speed recorded in the teaching point data is obtained, the realizable moving speed when the tip portion of the robot passes the inside of the teaching point is obtained, the deceleration rate with respect to the moving speed recorded in the teaching point data is calculated, and the straight portion deceleration rate set by the straight portion deceleration rate setting means and the inward turning portion deceleration rate set by the inward turning portion deceleration rate setting means are stored in the teaching point data. When the robot is operated, in accordance with the straight portion deceleration rate and the inward turning portion deceleration rate stored in the teaching point data, the moving speeds of the robot at the straight portion and the inward turning portion are reset, so that when the tool tip of the robot is moved straightly or when the straight movement and the inward turning movement are mixed, the generated acceleration can be suppressed under the predetermined maximum acceleration and smooth operation can be made without generating an oscillation.

According to a second aspect of the present invention, an apparatus for generating a trajectory for a robot, which receives, as input, teaching point data including a teaching point to give a reference of a trajectory on which a tip portion of the robot moves, a moving instruction to specify a trajectory shape on the basis of the teaching point, a moving speed specifying value to specify a speed at which the tip portion moves on the trajectory, and an allowable path error to specify a maximum value of an error between the teaching point and the trajectory, said apparatus comprising:

straight portion deceleration rate setting means for obtaining, at operation of the robot, a realizable moving speed when the tip portion of the robot moves on a straight line trajectory, and calculating a deceleration rate with respect to the moving speed specifying value recorded in the teaching point data;

inward turning portion deceleration rate setting means for obtaining, at the operation of the robot, a realizable moving speed when the tip portion of the robot passes the inside of the teaching point, and calculating a deceleration rate with respect to the moving speed specifying value recorded in the teaching point data;

moving speed resetting means for resetting, at the operation of the robot, moving speeds of the robot at a straight line portion and an inward turning portion in accordance with the calculated straight line portion deceleration rate and the calculated inward turning portion deceleration rate;

interpolation arithmetic means for executing interpolation arithmetic to a path specified by the teaching point data in accordance with the specified trajectory shape and the reset moving speeds, and outputting an angle change waveform of respective joint axes to operate the robot; and continuing means for smoothing an angle change of the respective joint axes of the robot when the tip portion passes through the teaching point, and generating a continuous curved line trajectory passing the inside of the teaching point in accordance with the allowable path error.

According to the second aspect of the present invention, when the robot is operated, the realizable moving speed when the tip portion of the robot moves on the straight line trajectory is obtained, the deceleration rate with respect to the moving speed recorded in the teaching point data is obtained, the realizable moving speed when the tip portion of the robot passes the inside of the teaching point is obtained, the deceleration rate with respect to the moving speed recorded in the teaching point data is calculated, and the moving speeds of the robot at the straight line portion and the inward turning portion are reset in accordance with the straight portion deceleration rate and the inward turning portion deceleration rate. According to this, when the tool end of the robot is moved straightly, or when the straight movement and the inward turning movement are mixed, the generated acceleration can be suppressed under a predetermined maximum acceleration and smooth operation can be made without generating an oscillation.

According to a third aspect of the present invention, an apparatus for generating a trajectory for a robot, which receives, as input, teaching point data including a teaching point to give a reference of a trajectory on which a tip portion of the robot moves, a moving instruction to specify a trajectory shape on the basis of the teaching point, a moving speed specifying value to specify a speed at which the tip portion moves on the trajectory, and an allowable path error to specify a maximum value of an error between the teaching point and the trajectory, said apparatus comprising:

change judgement means for judging whether the inputted teaching point data has been changed through an operation of the robot;

straight portion deceleration rate setting means for obtaining a realizable moving speed when the tip portion of the robot moves on a straight line trajectory, and calculating a deceleration rate with respect to the moving speed specifying value recorded in the teaching point data when the robot is operated;

inward turning portion deceleration rate setting means for obtaining a realizable moving speed when the tip portion of the robot passes an inside of the teaching point, and calculating a deceleration rate with respect to the moving speed specifying value recorded in the teaching point data when the robot is operated;

deceleration rate storage means for storing the straight portion deceleration rate set by the straight portion deceleration setting means and the inward turning portion deceleration rate set by the inward turning portion deceleration rate setting means into the teaching point data when the robot is operated;

moving speed resetting means for resetting moving speeds of the robot at a straight portion and an inward turning portion in accordance with the straight portion deceleration rate and the inward turning portion deceleration rate stored in the teaching point data, and if the teaching point data inputted from the change judgement means is teaching point data changed through calculation of the straight portion deceleration rate and the inward turning portion deceleration rate by the operation of the robot, resetting a speed in accordance with the straight portion deceleration rate and the inward turning portion deceleration rate stored in the teaching point data without anew calculating the straight line deceleration rate and the inward turning portion deceleration rate when the robot is operated;

interpolation arithmetic means for executing interpolation arithmetic to a path specified by the teaching point data in accordance with the specified trajectory shape and the reset moving speeds, and outputting an angle change waveform of respective joint axes to operate the robot; and continuing means for smoothing an angle change of the respective joint axes of the robot when the tip portion passes through the teaching point, and generating a continuous curved line trajectory passing the inside of the teaching point in accordance with the allowable path error.

According to the third aspect of the present invention, when the robot is operated, the realizable moving speed when the tip portion of the robot moves on the straight line trajectory is obtained, the deceleration rate with respect to the moving speed recorded in the teaching point data is obtained, the realizable moving speed when the tip portion of the robot passes the inside of the teaching point is obtained, the deceleration rate with respect to the moving speed recorded in the teaching point data is calculated, and the straight portion deceleration rate set by the straight portion deceleration rate setting means and the inward turning portion deceleration rate set by the inward turning portion deceleration rate setting means are stored in the teaching point data. At subsequent operations, the moving speeds of the robot at the straight line portion and the inward turning portion are reset in accordance with the straight portion deceleration rate and the inward turning portion deceleration rate stored in the teaching point data, so that when the tool end of the robot is moved straightly, or when the straight movement and inward turning movement are mixed, the generated acceleration can be suppressed under the predetermined maximum acceleration and smooth operation can be made without generating an oscillation.

According to a fourth aspect of the present invention, in the apparatus for generating a trajectory for a robot according to the first aspect of the invention, the straight portion deceleration rate setting means receives two continuous teaching point data as input, calculates an acceleration of the respective joint axes generated when the tip portion of the robot moves along the straight line trajectory between the teaching points at the moving speed specifying value stored in the teaching point data before the robot is actually operated, compares the generated acceleration with a maximum acceleration of the respective joint axes, and if the generated acceleration exceeds the maximum acceleration, calculates an operational speed so that the generated acceleration does not exceed the maximum acceleration, and sets the straight portion deceleration rate by dividing the operational speed by the moving speed specifying value in the teaching point data.

According to a fifth aspect of the present invention, in the apparatus for generating a trajectory for a robot according to the second or third aspect of the invention, the straight portion deceleration rate setting means receives two continuous teaching point data as input, calculates an acceleration of the respective joint axes generated when the tip portion of the robot moves along the straight line trajectory between the teaching points at the moving speed specifying value stored in the teaching point data when the robot is actually operated, compares the generated acceleration with a maximum acceleration of the respective joint axes, and if the generated acceleration exceeds the maximum acceleration, calculates an operational speed so that the generated acceleration does not exceed the maximum acceleration, and sets the straight portion deceleration rate by dividing the operational speed by the moving speed specifying value in the teaching point data.

According to a sixth aspect of the present invention, in the apparatus for generating a trajectory for a robot according to the first aspect of the invention, the inward turning portion deceleration rate setting means receives three continuous teaching point data as input, calculates an acceleration of respective joint axes generated when the tip portion of the robot moves between the teaching points along the curved line trajectory passing the inside of the teaching point within the allowable path error at the moving speed specifying value stored in the teaching point data before the robot is actually operated, compares the generated acceleration with a maximum acceleration of the respective joint axes, and if the generated acceleration exceeds the maximum acceleration, calculates an operational speed so that the generated acceleration does not exceed the maximum acceleration, and sets the inward turning portion deceleration rate by dividing the operational speed by the moving speed specifying value in the teaching point data.

According to a seventh aspect of the present invention, in the apparatus for generating a trajectory for a robot according to the second or third aspect of the invention, the inward turning portion deceleration rate setting means receives three continuous teaching point data as input, calculates an acceleration of respective joint axes generated when the tip portion of the robot moves between the teaching points along the curved line trajectory passing the inside of the teaching point within the allowable path error at the moving speed specifying value stored in the teaching point data when the robot is actually operated, compares the generated acceleration with a maximum acceleration of the respective joint axes, and if the generated acceleration exceeds the maximum acceleration, calculates an operational speed so that the generated acceleration does not exceed the maximum acceleration, and sets the inward turning portion deceleration rate by dividing the operational speed by the moving speed specifying value in the teaching point data.

According to an eighth aspect of the present invention, in the apparatus for generating a trajectory for a robot according to any one of the first to third aspect of the invention, the deceleration rate storage means stores the straight portion deceleration rate set by the straight portion deceleration rate setting means and the inward turning portion deceleration rate set by the inward turning portion setting means in the teaching point data without rewriting the data of the moving speed.

According to a ninth aspect of the present invention, in the apparatus for generating a trajectory for a robot according to the first aspect of the invention, the moving speed resetting means resets the moving speeds at the straight portion and the inward turning portion by multiplying the moving speed specifying value in the teaching point data by the straight portion deceleration rate and the inward turning portion deceleration rate stored in the teaching point data when the robot is operated.

According to the respective aspects of the present invention, when the tool end of the robot is moved straightly, or when the straight movement and inward turning movement are mixed, the generated acceleration can be suppressed under a predetermined maximum acceleration, the operation can be made smooth without generating an oscillation, and such setting can be automatically made.

BRIEF DESCRIPTION OF THE DRAWINGS

FIG. 4 is a view for explaining a deceleration rate storing means in the apparatus for generating a trajectory for a robot according to the present invention;

DESCRIPTION OF THE EMBODIMENTS

Embodiment 1

A first embodiment of an apparatus for generating a trajectory for an industrial robot according to the present invention will be described with reference to the drawings.

Figure 1A:
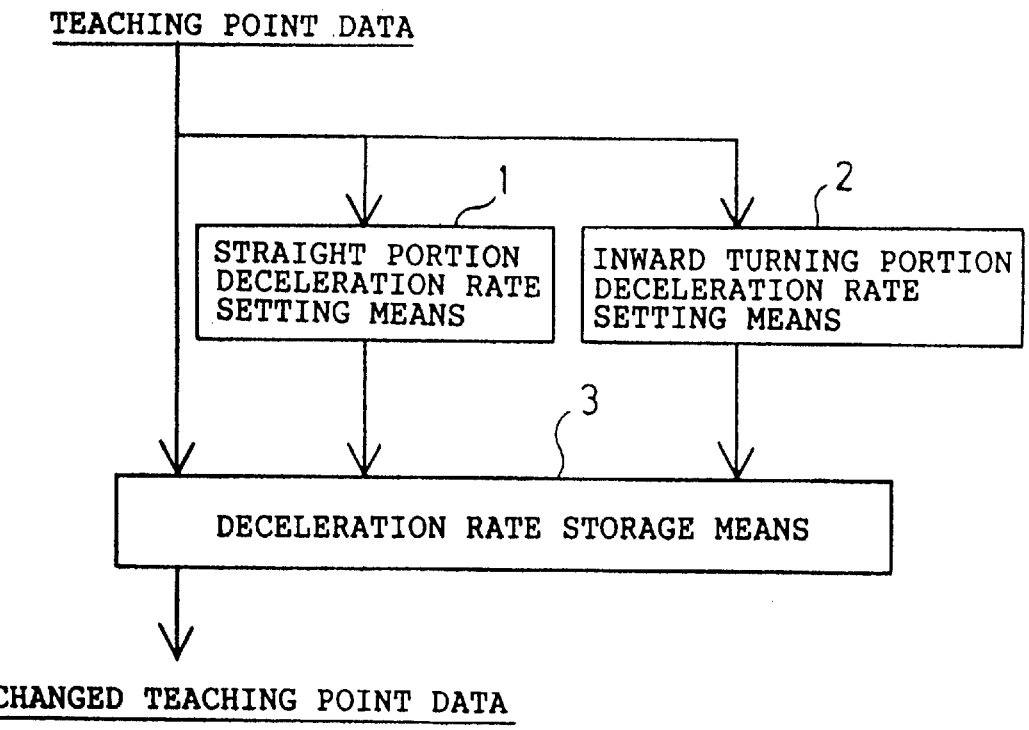
FIGS. 1A and 1B are block diagrams for showing the structure of an embodiment of an apparatus for generating a trajectory for a robot according to the present invention.
Figure 1B:
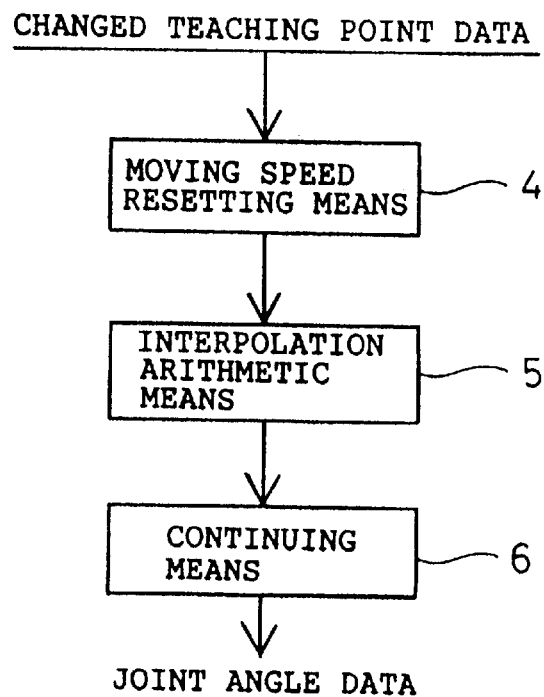

FIGS. 1A and 1B are block diagrams showing the structure of this embodiment. In FIG. 1A, reference numeral 1 denotes a straight portion deceleration rate setting means, 2 denotes an inward turning portion deceleration rate setting means, and 3 denotes a deceleration rate storage means.

The mutual relation of the above components and the operation will be described.

The straight portion deceleration rate setting means 1 receives teaching point data as input, obtains a realizable moving speed when a tip portion of a robot moves on a straight line trajectory, calculates a deceleration rate with respect to a specifying moving speed value recorded in the teaching point data, and outputs the result to the inward turning portion deceleration rate setting means 2 and the deceleration rate storing means 3.

The inward turning portion deceleration rate setting means 2 receives the teaching point data and the straight portion deceleration rate as input, obtains a realizable moving speed when the tip portion of the robot moves the inside of the teaching point, calculates a deceleration rate with respect to the specifying moving speed value recorded in the teaching point data, and outputs the result to the deceleration rate storing means 3.

The deceleration rate storing means 3 receives the teaching point data, the straight portion deceleration rate, and the inward turning portion deceleration rate as input, and constructs teaching point data changed by adding the straight portion deceleration rate and the inward turning portion deceleration rate into the teaching point data.

In FIG. 1B, reference numeral 4 denotes a moving speed resetting means, 5 denotes an interpolation arithmetic means, and 6 denotes a continuing means.

The moving speed resetting means 4 receives the changed teaching point data as input, and in accordance with the straight portion deceleration rate, the inward turning portion deceleration rate and the moving speed, the resetting means 4 resets the moving speeds of the robot at the straight portion and inward turning portion, and outputs the result to the interpolation arithmetic means 5.

The interpolation arithmetic means 5 calculates the path specified by the teaching point data in accordance with the specified trajectory shape and the moving speeds at the straight portion and inward turning portion, and outputs an angle change waveform of the respective joint axes of the robot to the continuing means 6.

The continuing means 6 smoothes an angle change of the respective joint axes of the robot in the vicinity of the teaching point, and generates a continuous curved line trajectory passing the inside of the teaching point in accordance with the allowable path error stored in the teaching point data.

Figure 2A:
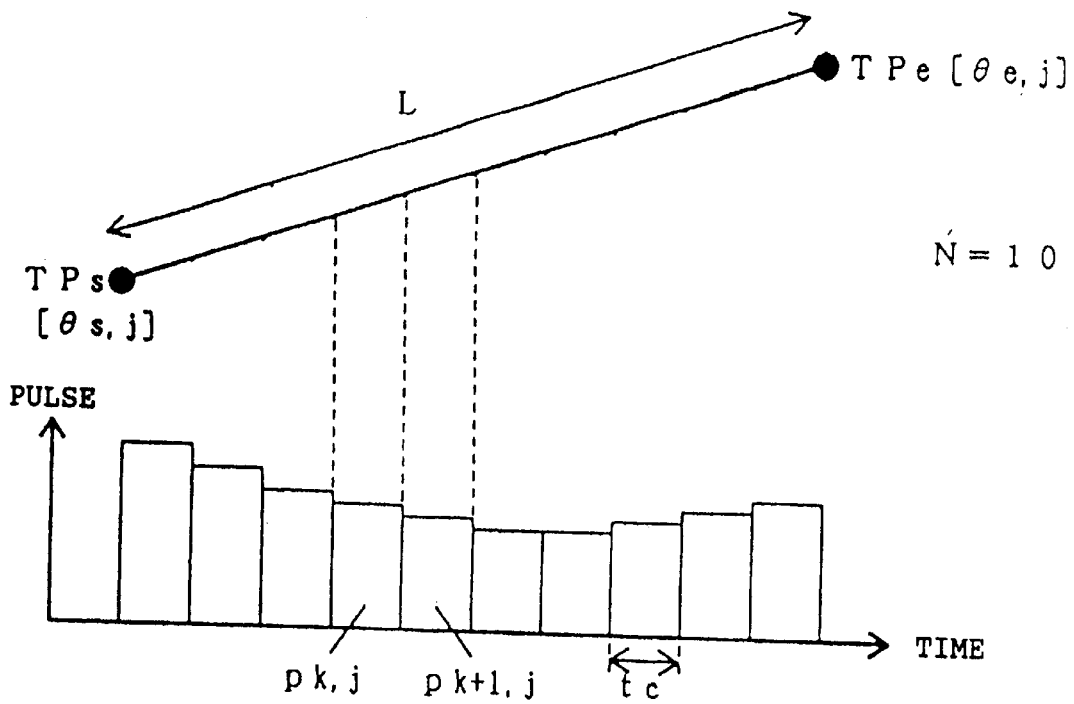
FIGS. 2A and 2B are views for explaining a method of setting a straight portion deceleration rate in the apparatus for generating a trajectory for a robot according to the present invention.
Figure 2B:
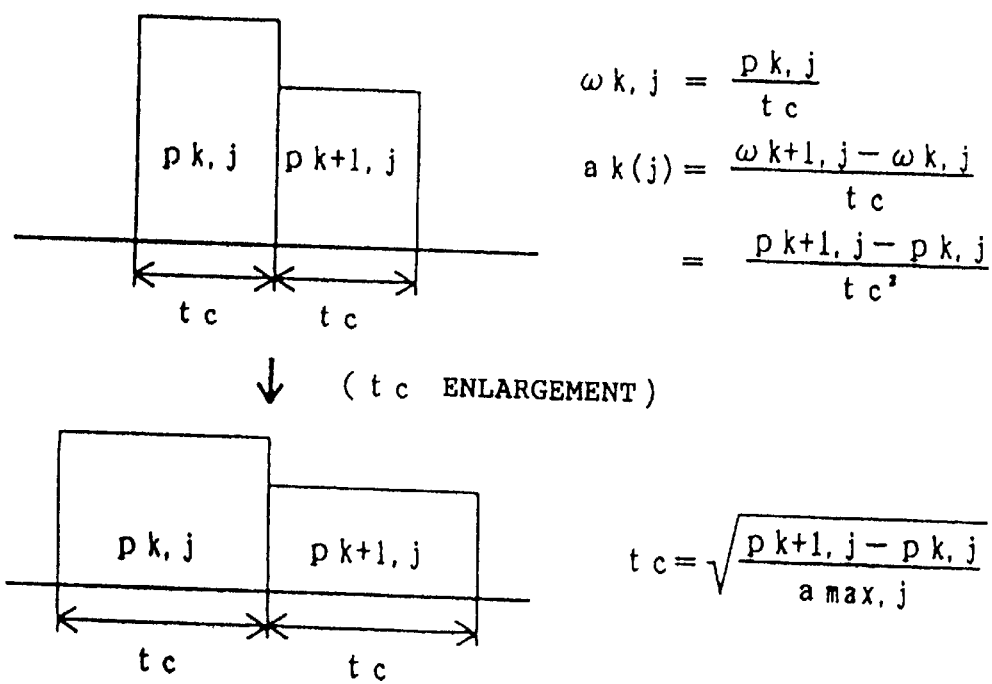

FIGS. 2A and 2B show the process contents of the straight portion deceleration rate setting means 1.

In the drawings, reference character TPs denotes a start point (teaching point) of straight line interpolation arithmetic, and TPe denotes an end point (teaching point) of the linear interpolation arithmetic. θs denotes a joint angle vector at the start point, and θe denotes a joint angle vector at the end point. L denotes a distance between the teaching points, and V denotes a moving speed specifying value specified by the teaching point data. Reference character pk denotes a moving amount vector between obtained interpolation points, and αmax denotes an acceleration upper limit value vector of the respective joint axes of the robot. In FIGS. 2A through 5, additional letter j expresses a component of a vector.

First, a moving time T in the case where interpolation arithmetic between teaching points is carried out with a straight line, is obtained by equation (1).

$$T = L/V \quad (1)$$

By dividing the obtained moving time T by ten, a temporary interpolation time tc is set by equation (2).

$$tc = T/10 \quad (2)$$

As shown in FIG. 2A, the portion between the teaching points is divided by ten, and joint angles at the respective division points are obtained, so that interpolation points at the temporary interpolation time tc are made.

Next, as shown in FIG. 2B, a speed $\omega k,j$ of the respective axes is obtained from the obtained joint angles of the respective axes by equation (3), and an acceleration $ak,j$ between two interpolation points is obtained by equation (4).

$$\omega k, j = pk, j / tc \quad (3)$$

$$\begin{aligned} ak, j &= (\omega k + 1, j - \omega k, j)/tc \\ &= (pk + 1, j - pk, j)/tc^2 \end{aligned} \quad (4)$$

If the acceleration obtained by equation (4) is larger than the acceleration upper limit value, the interpolation time tc is enlarged in accordance with equation (5) so as to prevent over-acceleration.

$$tc = \{(pk+1,j-pk,j)/\alpha max,j\}^{0.5} \quad (5)$$

The above arithmetic is carried out for all ten interpolation points to obtain the maximum value tmax of the interpolation time tc, and a realizable speed Va is determined by equation (6).

$$Va = L/(10 \cdot t_{max}) \quad (6)$$

A straight portion deceleration rate $\epsilon L$ is calculated in accordance with equation (7) as the ratio of the realizable speed Va to the original moving speed specifying value V.

$$\epsilon L = Va/V \quad (7)$$

When a robot is actually operated, if the speed Va is generated by multiplying the moving speed specifying value V in the teaching point data by the straight portion deceleration rate $\epsilon L$, and the linear interpolation arithmetic is carried out between the teaching points TPs and TPe, then acceleration over the acceleration upper limit value is not generated.

The above process is carried out to make arithmetic before the robot is actually operated, such as the teaching time of the robot or editing time of the existing teaching point data, or when the robot is actually operated.

Figure 3A:
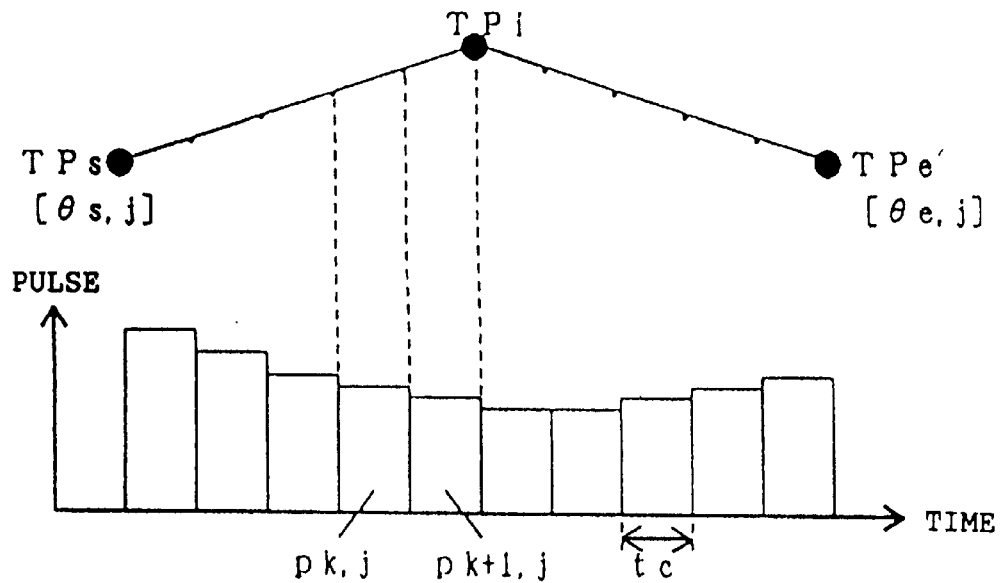
FIGS. 3A and 3B are views for explaining a method of setting an inward turning portion deceleration rate in the apparatus for generating a trajectory for a robot according to the present invention.
Figure 3B:
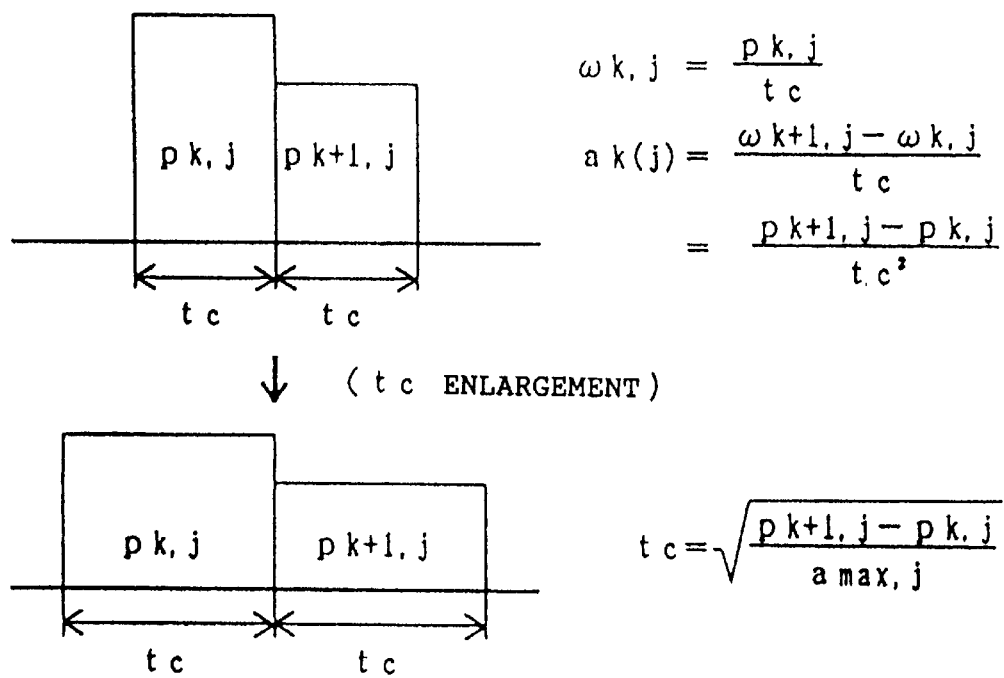

FIGS. 3A and 3B show the process contents of the inward turning portion deceleration rate setting means 2.

It is premised that as proposed by Japanese Patent Application No. 7-322201 of the present applicant, the objective apparatus for generating a trajectory for a robot includes the continuing means 6 in which when the data of three continuous teaching points is given, in accordance with the value of an allowable path error recorded in the data of the second teaching point, an angle change of the respective joint axes of the robot in the case where straight line interpolation is carried out in the vicinity of the second teaching point is made smooth, and a continuous curved line trajectory passing the inside of the teaching point is generated.

In FIGS. 3A and 3B, TPs denotes a start point (teaching point) of inward turning portion interpolation arithmetic, TPi denotes a target teaching point to which inward turning is performed, and TPe denotes an end point (teaching point) of the inward turning portion interpolation arithmetic.

As a speed at which interpolation arithmetic of the inward turning portion is carried out, there is used a speed determined by the straight portion deceleration rate and teaching point data, that is, the speed Va determined by the above equation (6). In this case, it is assumed that Vas denotes a moving speed between the teaching point TPs and the teaching point TPi, and Vae denotes a moving speed between the teaching point TPi and the teaching point TPe.

As shown in FIG. 3A, the respective interpolation points of the inward turning portion are obtained, and it is assumed that a moving amount vector of each joint axis between the interpolation points is designated by pk.

Next, as shown in FIG. 3B, from the obtained joint angle of the respective axes, the speed $\omega k,j$ of the respective axes is obtained by equation (3) in the same manner as the case where the straight portion deceleration rate is obtained, and acceleration ak,j between the two interpolation points is obtained by equation (4).

If the acceleration obtained by equation (4) is larger than the acceleration upper limit value, the interpolation time tc is enlarged in accordance with equation (5) so that the generated acceleration is made equal to the acceleration upper limit value.

The above arithmetic is carried out for all interpolation points or interpolation points in the vicinity of the teaching point TPi to obtain the maximum value t max of the interpolation time tc.

The inward turning portion deceleration rate $\epsilon r$ is obtained by equation (8) from the interpolation time tc determined at interpolation arithmetic by the moving speed Vas and Vae, and the maximum value tmax obtained by the above process.

$$\epsilon r = tc/tmax. \quad (8)$$

When the robot is actually operated, if the inward turning arithmetic among teaching points TPs, TPi and TPe is carried out by multiplying the speed Va in the inward turning objective interval by the inward turning portion deceleration rate $\epsilon r$ obtained above, an acceleration exceeding the acceleration upper limit value does not occur.

The above process is carried out to make arithmetic before the robot is actually operated, such as the teaching time of the robot or editing time of the existing teaching point data, or when the robot is actually operated.

FIG. 4 shows the process contents of the deceleration rate storage means 3.

The straight portion deceleration rate $\epsilon L$ set by the straight portion deceleration rate setting means 1 and the inward turning portion deceleration rate $\epsilon r$ set by the inward turning portion setting means 2 are stored as changed teaching point data in the form of addition into the data of the respective teaching points without rewriting data of moving speed specifying value V originally set by a user. In FIG. 4, TPdk is teaching point data corresponding to teaching point TPk, and the operation program in this example includes N pieces of teaching point data.

In accordance with the process of FIGS. 1A and 1B, the straight portion deceleration rate $\epsilon Lk$ set for each interval between the respective teaching points is added to the respective teaching point data from the teaching point TP1 to the teaching point TPN-1, and the inward turning portion deceleration rate $\epsilon r$ set for every inward turning target point is added to the teaching point data from the teaching point TP2 to the teaching point TPN-1, so that the changed teaching point data is formed.

Figure 5:
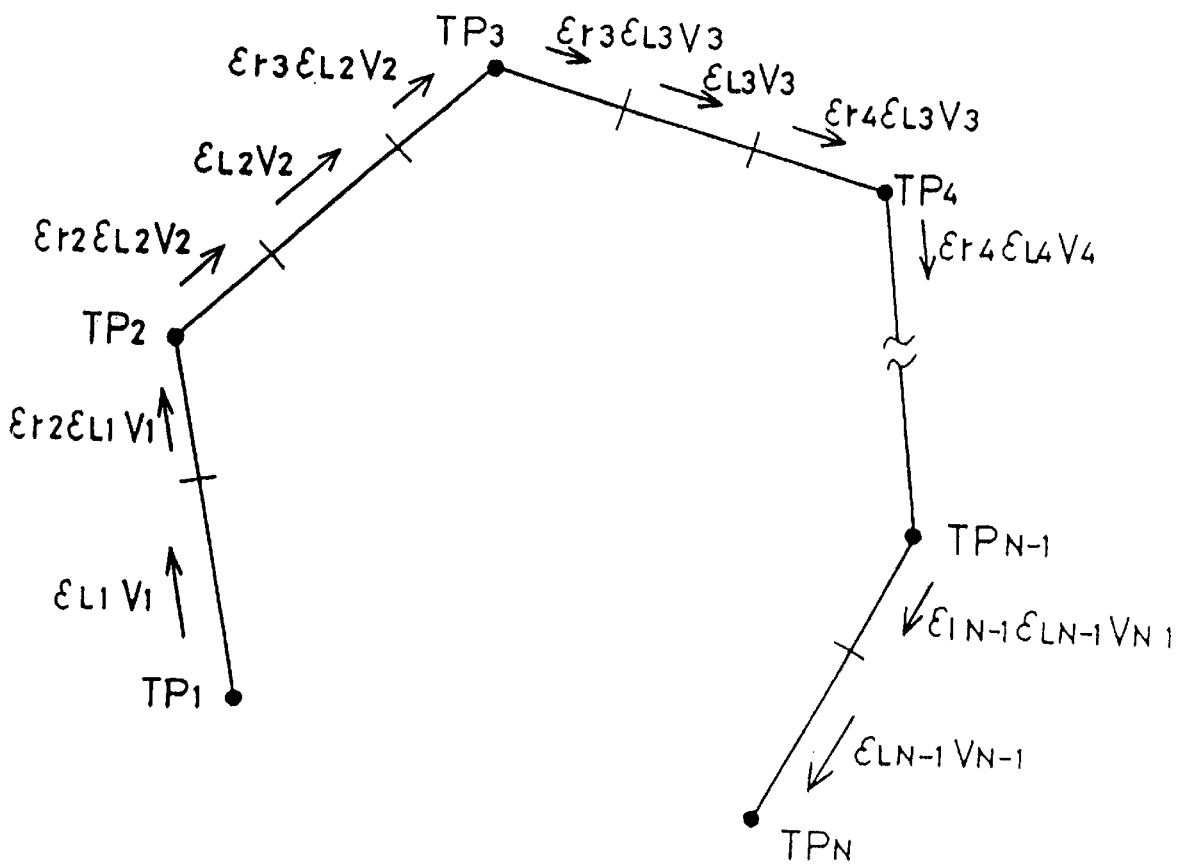
FIG. 5 is a view for explaining a moving speed resetting means in the apparatus for generating a trajectory for a robot according to the present invention.

FIG. 5 shows the process contents of the moving speed resetting means 4.

At the operation of the robot, the moving speeds at the straight portion and the inward turning portion are reset by multiplying the moving speed in the teaching point data by the straight portion deceleration rate $\epsilon L$ and the inward turning portion deceleration rate $\epsilon r$ stored in the changed teaching point data.

In the drawing, the straight line interpolation arithmetic is carried out at speed $\epsilon L1V1$ in the straight portion from the teaching point TP1 to the teaching point TP2. The interpolation arithmetic is carried out at speed $\epsilon r2\epsilon L1V1$ in the former half of the inward turning portion in the vicinity of the teaching point TP2, and the interpolation arithmetic is carried out at speed $\epsilon r2\epsilon L2V2$ in the latter half of the inward turning portion in the vicinity of the teaching point TP2. In the case where there is a straight moving distance between the latter half of the inward turning portion in the vicinity of the teaching point TP2 and the former half of the inward turning portion in the vicinity of the teaching point TP3, the straight line interpolation is carried out at the moving speed $\epsilon L2V2$, and interpolation at the speed $\epsilon r3\epsilon L2V2$ is carried out for the moving speed of the former half of the inward turning portion in the vicinity of the teaching point TP3 in the same manner as the case of the teaching point TP2. Subsequently, in accordance with the speed $\epsilon Lk$ and $\epsilon rk$, a speed is determined. The difference of the moving speed generated at the connecting portion from the straight portion to the inward turning portion is made small by performing acceleration and deceleration calculation to carry out a smooth speed change.

According to this structure, when the tool tip of a robot is straightly moved, or the straight movement and inward turning movement are mixed, the generated acceleration can be suppressed under a predetermined maximum acceleration, and the robot can be smoothly operated without generating an oscillation.

Embodiment 2

Another embodiment of an apparatus for generating a trajectory for an industrial robot according to the present invention will be described with reference to the drawings.

Figure 6:
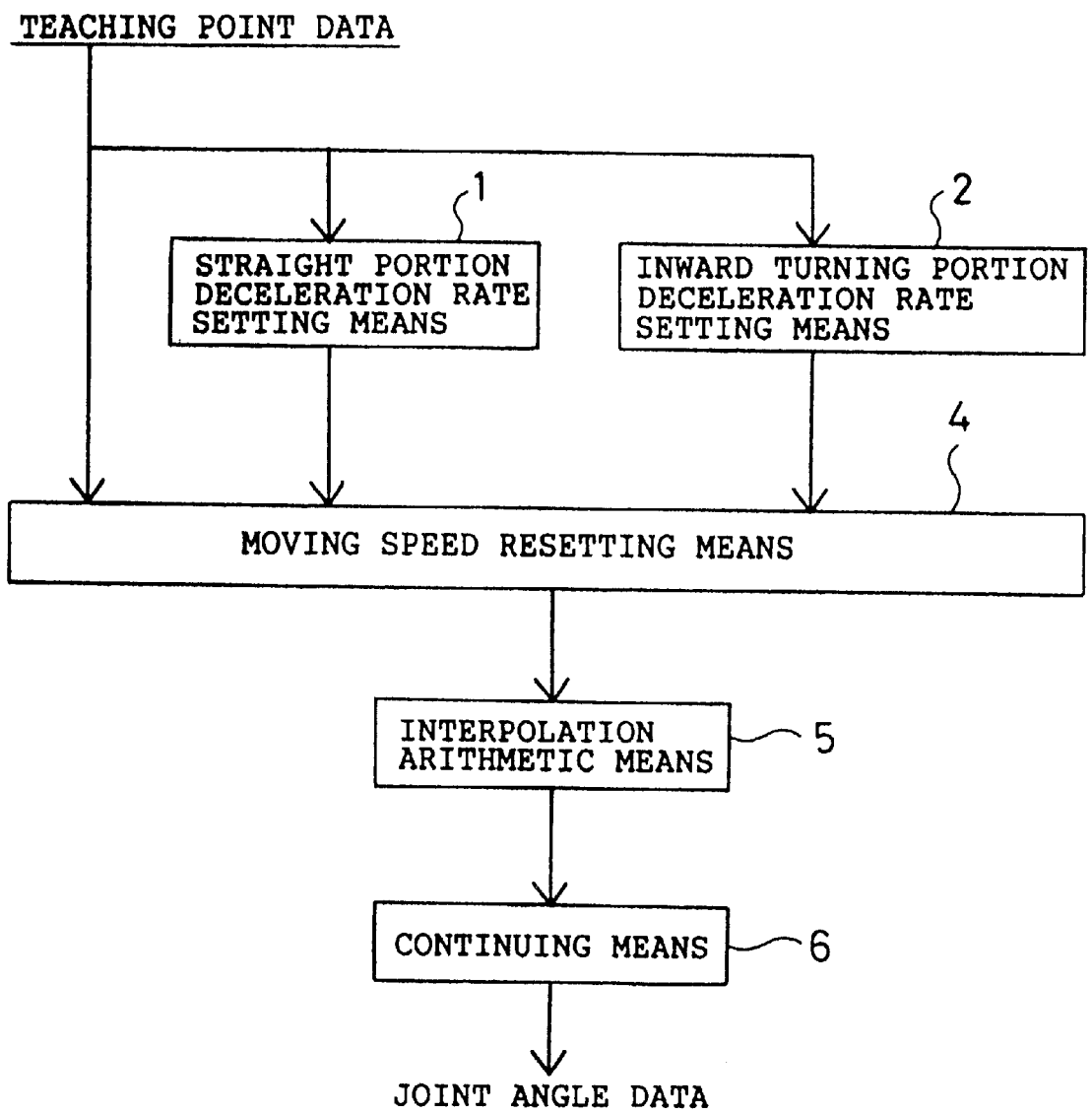
FIG. 6 is a block diagram showing the structure of another embodiment of an apparatus for generating a trajectory for a robot according to the present invention.

FIG. 6 is a block diagram showing the structure of this embodiment. In FIG. 6, reference numeral 1 denotes a straight portion deceleration rate setting means, 2 denotes an inward turning portion deceleration rate setting means, 4 denotes a moving speed resetting means, 5 denotes an interpolation arithmetic means, and 6 denotes a continuing means.

The mutual relation and operation of the above components will be described.

When a robot is operated, the straight portion deceleration rate setting means 1 receives teaching point data as input, obtains a realizable moving speed when the tip portion of the robot moves on a straight line trajectory, calculates a deceleration rate with respect to a moving speed recorded in the teaching point data, and outputs the result to the inward turning portion deceleration rate setting means 2 and the moving speed resetting means 4.

The inward turning portion deceleration rate setting means 2 receives the teaching point data and the straight portion deceleration rate as input, obtains a realizable moving speed when the tip portion of the robot passes the inside of the teaching point, calculates a deceleration rate with respect to the moving speed specifying value recorded in the teaching point data, and outputs the result to the moving speed resetting means 4.

The moving speed resetting means 4 receives the straight portion deceleration rate, the inward turning portion deceleration rate, and the teaching point data as input, resets the moving speeds of the robot at the straight portion and inward turning portion in accordance with the straight portion deceleration rate, the inward turning portion deceleration rate, and the moving speed, and outputs the result to the interpolation arithmetic means 5.

The interpolation arithmetic means 5 executes interpolation arithmetic to a path specified by the teaching point data in accordance with the specified trajectory shape and the moving speeds at the straight portion and the inward turning portion, and outputs an angle change waveform of respective joint axes of the robot to the continuing means 6.

The continuing means 6 smoothes an angle change of the respective joint axes of the robot when the tip portion passes through the teaching point, and in accordance with the allowable path error stored in the teaching point data, the continuing means generates a continuous curved line trajectory passing the inside of the teaching point.

Also by this structure, when the tool tip of the robot is straightly moved, or when the straight movement and inward turning movement are mixed, the generated acceleration can be suppressed under a predetermined maximum acceleration and the robot can be smoothly moved without generating an oscillation.

Embodiment 3

Other embodiment of an apparatus for generating a trajectory for a robot according to the present invention will be described with reference to the drawings.

Figure 7:
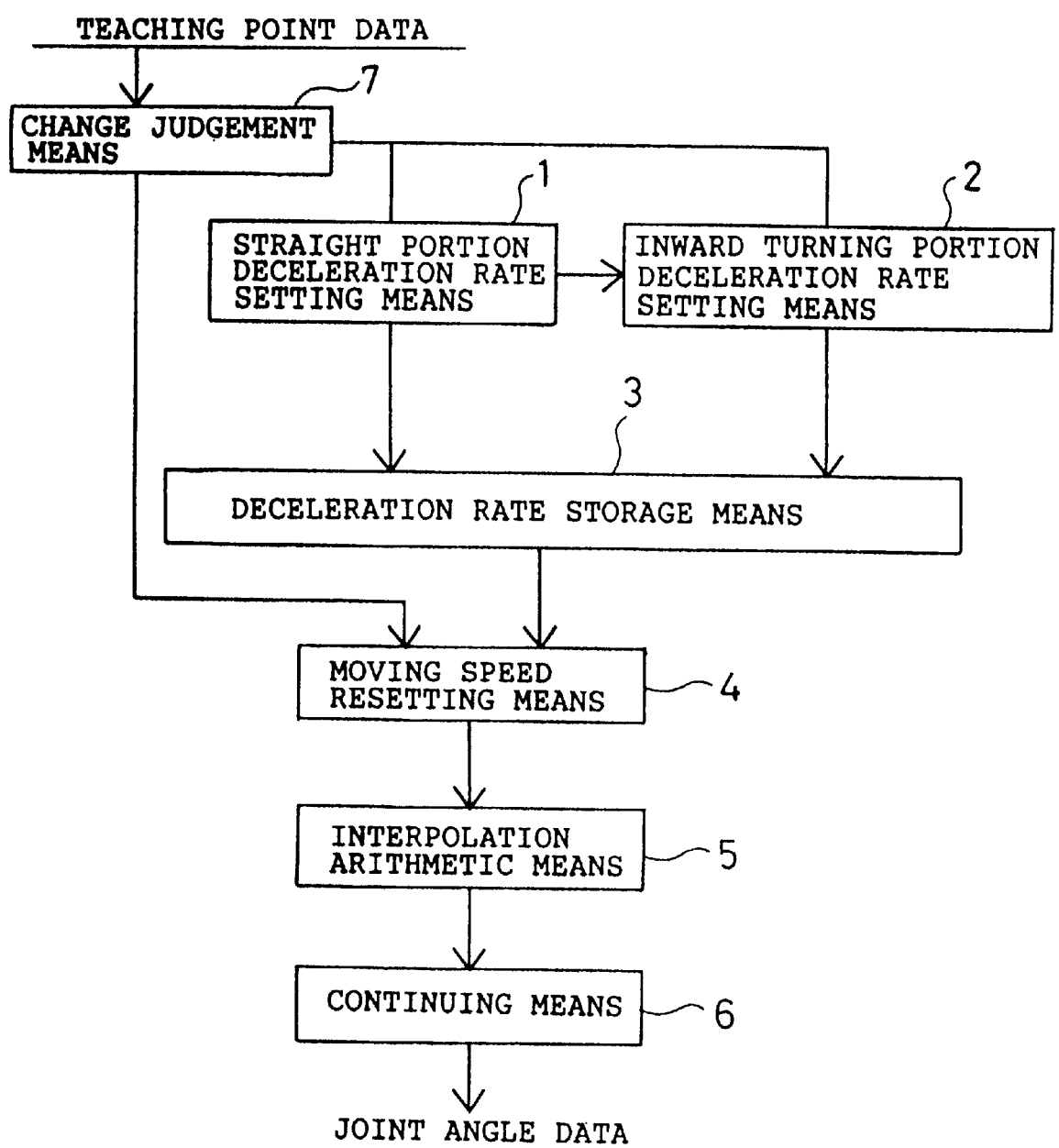
FIG. 7 is a block diagram showing the structure of still another embodiment of an apparatus for generating a trajectory for a robot according to the present invention.

FIG. 7 is a block diagram showing the structure of this embodiment. In FIG. 7, reference numeral 7 denotes a change judgement means, 1 denotes a straight portion deceleration rate setting means, 2 denotes an inward turning portion deceleration rate setting means, 3 denotes a deceleration rate storage means, 4 denotes a moving speed resetting means, 5 denotes an interpolation arithmetic means, and 6 denotes a continuing means. The mutual relation and operation of the above components will be described.

The change judgement means 7 receives the teaching point data as input, and in accordance with the teaching point data, operates the robot, and judges whether the straight portion deceleration rate and inward turning portion deceleration rate are stored in the teaching point data, and the teaching point data is changed. If the teaching point data is changed, the judgement means outputs the teaching point data to the moving speed resetting means 4, and if it is not changed, the judgement means outputs the teaching point data to the straight portion deceleration rate setting means 1 and the inward turning portion deceleration rate setting means 2. The straight portion deceleration rate setting means 1 receives the teaching point data as input, obtains a realizable moving speed when the tip portion of the robot moves on the straight line trajectory, calculates the deceleration rate with respect to the moving speed specifying value recorded in the teaching point data, and outputs the result to the inward turning portion deceleration rate setting means 2 and the deceleration rate storage means 3.

The inward turning portion deceleration rate setting means 2 receives the teaching point data and the straight portion deceleration rate as input, obtains a realizable moving speed when the tip portion of the robot passes the inside of the teaching point, calculates a deceleration rate with respect to the moving speed specifying value recorded in the teaching point data, and outputs the result to the deceleration rate storage means 3.

The deceleration rate storage means 3 receives the teaching point data, the straight portion deceleration rate, and the inward turning portion deceleration rate as input, and forms the changed teaching point data by adding the straight portion deceleration rate and the inward turning portion deceleration rate into the teaching data.

The moving speed resetting means 4 receives the teaching data as input, and in accordance with the straight portion deceleration rate, the inward turning portion deceleration rate, and the moving speed specifying value, resets the moving speeds of the robot at the straight portion and the inward turning portion, and outputs the result to the interpolation arithmetic means 5.

The interpolation arithmetic means 5 executes interpolation arithmetic to a path specified by the teaching point data in accordance with the specified trajectory shape and the moving speeds at the straight portion and the inward turning portion, and outputs an angle change waveform of the respective joint axes of the robot to the continuing means 6.

The continuing means 6 smoothes an angle change of the respective joint axes of the robot in the vicinity of the teaching point, and in accordance with the allowable path error stored in the teaching point data, generates a continuous curved line trajectory passing the inside of the teaching point.

Also by this structure, when the tool tip of the robot is straightly moved, or when the straight movement and inward turning movement are mixed, the generated acceleration can be suppressed under a predetermined maximum acceleration and the robot can be smoothly moved without generating an oscillation.

It is needless to say that the respective components and operations of the above embodiments can be realized by a program of a microcomputer.

We claim:

1. An apparatus for generating a trajectory for a robot, which receives, as input, teaching point data including a teaching point to give a reference of a trajectory on which a tip portion of the robot moves, a moving instruction to specify a trajectory shape on the basis of the teaching point, a moving speed specifying value to specify a speed at which the tip portion moves on the trajectory, and an allowable path error to specify a maximum value of an error between the teaching point and the trajectory, said apparatus comprising:

straight portion deceleration rate setting means for obtaining a realizable moving speed when the tip portion of the robot moves on a straight line trajectory, and calculating a deceleration rate with respect to the moving speed specifying value recorded in the teaching point data before the robot is actually operated, such as a teaching time of the robot or an editing time of existing teaching data;

inward turning portion deceleration rate setting means for obtaining a realizable moving speed when the tip portion of the robot passes an inside of the teaching point, and calculating a deceleration rate with respect to the moving speed specifying value recorded in the teaching point data before the robot is actually operated, such as the teaching time of the robot or the editing time of the existing teaching point data;

deceleration rate storage means for storing the straight portion deceleration rate set by the straight portion setting means and the inward turning portion deceleration rate set by the inward turning portion deceleration rate setting means into the teaching point data before the robot is actually operated, such as the teaching time of the robot or the editing time of the existing teaching point data;

moving speed resetting means for resetting moving speeds of the robot at a straight portion and an inward turning portion in accordance with the straight portion deceleration rate and the inward turning portion deceleration rate stored in the teaching point data when the robot is operated;

interpolation arithmetic means for executing interpolation arithmetic to a path specified by the teaching point data in accordance with the specified trajectory shape and the reset moving speeds, and outputting an angle change waveform of respective joint axes to operate the robot; and continuing means for smoothing an angle change of the respective joint axes of the robot when the tip portion passes through the teaching point, and generating a continuous curved line trajectory passing the inside of the teaching point in accordance with the allowable path error.

2. An apparatus for generating a trajectory for a robot as claimed in claim 1, wherein said straight portion deceleration rate setting means receives two continuous teaching point data as input, calculates an acceleration of the respective joint axes generated when the tip portion of the robot moves along the straight line trajectory between the teaching points at the moving speed specifying value stored in the teaching point data before the robot is actually operated, compares the generated acceleration with a maximum acceleration of the respective joint axes, and if the generated acceleration exceeds the maximum acceleration, calculates an operational speed so that the generated acceleration does not exceed the maximum acceleration, and sets the straight portion deceleration rate by dividing the operational speed by the moving speed specifying value in the teaching point data.

3. An apparatus for generating a trajectory for a robot as claimed in claim 1, wherein the inward turning portion deceleration rate setting means receives three continuous teaching point data as input, calculates an acceleration of respective joint axes generated when the tip portion of the robot moves between the teaching points along the curved line trajectory passing the inside of the teaching points within the allowable path error at the moving speed specifying value stored in the teaching point data before the robot is actually operated, compares the generated acceleration with a maximum acceleration of the respective joint axes, and if the generated acceleration exceeds the maximum acceleration, calculates an operational speed so that the generated acceleration does not exceed the maximum acceleration, and sets the inward turning portion deceleration rate by dividing the operational speed by the moving speed specifying value in the teaching point data.

4. An apparatus for generating a trajectory for a robot as claimed in claim 1, wherein said deceleration rate storage means stores the straight portion deceleration rate set by the straight portion deceleration rate setting means and the inward turning portion deceleration rate set by the inward turning portion setting means into the teaching point data without rewriting data of the moving speed.

5. An apparatus for generating a trajectory for a robot as claimed in claim 1, wherein said moving speed resetting means resets the moving speeds at the straight portion and the inward turning portion by multiplying the moving speed specifying value in the teaching point data by the straight portion deceleration rate and the inward turning deceleration rate stored in the teaching point data when the robot is operated.

6. An apparatus for generating a trajectory for a robot, which receives, as input, teaching point data including a teaching point to give a reference of a trajectory on which a tip portion of the robot moves, a moving instruction to specify a trajectory shape on the basis of the teaching point, a moving speed specifying value to specify a speed at which the tip portion moves on the trajectory, and an allowable path error to specify a maximum value of an error between the teaching point and the trajectory, said apparatus comprising:

straight portion deceleration rate setting means for obtaining, at operation of the robot, a realizable moving speed when the tip portion of the robot moves on a straight line trajectory, and calculating a deceleration rate with respect to the moving speed specifying value recorded in the teaching point data;

inward turning portion deceleration rate setting means for obtaining, at the operation of the robot, a realizable moving speed when the tip portion of the robot passes an inside of the teaching point, and calculating a deceleration rate with respect to the moving speed specifying value recorded in the teaching point data;

moving speed resetting means for resetting, at the operation of the robot, moving speeds of the robot at a straight line portion and an inward turning portion in accordance with the calculated straight line portion deceleration rate and the calculated inward turning portion deceleration rate;

interpolation arithmetic means for executing interpolation arithmetic to a path specified by the teaching point data in accordance with the specified trajectory shape and the reset moving speeds, and outputting an angle change waveform of respective joint axes to operate the robot; and continuing means for smoothing an angle change of the respective joint axes of the robot when the tip portion passes through the teaching point, and generating a continuous curved line trajectory passing through the inside of the teaching point in accordance with the allowable path error.

7. An apparatus for generating a trajectory for a robot as claimed in claim 6, wherein said straight portion deceleration rate setting means receives two continuous teaching point data as input, calculates an acceleration of the respective joint axes generated when the tip portion of the robot moves along the straight line trajectory between the teaching points at the moving speed specifying value stored in the teaching point data when the robot is actually operated, compares the generated acceleration with a maximum acceleration of the respective joint axes, and if the generated acceleration exceeds the maximum acceleration, calculates an operational speed so that the generated acceleration does not exceed the maximum acceleration, and sets the straight portion deceleration rate by dividing the operational speed by the moving speed specifying value in the teaching point data.

8. An apparatus for generating a trajectory for a robot as claimed in claim 6, wherein the inward turning portion deceleration rate setting means receives three continuous teaching point data as input, calculates an acceleration of respective joint axes generated when the tip portion of the robot moves between the teaching points along the curved line trajectory passing the inside of the teaching points within the allowable path error at the moving speed specifying value stored in the teaching point data when the robot is actually operated, compares the generated acceleration with a maximum acceleration of the respective joint axes, and if the generated acceleration exceeds the maximum acceleration, calculates an operational speed so that the generated acceleration does not exceed the maximum acceleration, and sets the inward turning portion deceleration rate by dividing the operational speed by the moving speed specifying value in the teaching point data.

9. An apparatus for generating a trajectory for a robot, which receives, as input, teaching point data including a teaching point to give a reference of a trajectory on which a tip portion of the robot moves, a moving instruction to specify a trajectory shape on the basis of the teaching point, a moving speed specifying value to specify a speed at which the tip portion moves on the trajectory, and an allowable path error to specify a maximum value of an error between the teaching point and the trajectory, said apparatus comprising:

change judgement means for judging whether the inputted teaching point data has been changed through an operation of the robot;

straight portion deceleration rate setting means for obtaining a realizable moving speed when the tip portion of the robot moves on a straight line trajectory, and calculating a deceleration rate with respect to the moving speed specifying value recorded in the teaching point data when the robot is operated;

inward turning portion deceleration rate setting means for obtaining a realizable moving speed when the tip portion of the robot passes an inside of the teaching point, and calculating a deceleration rate with respect to the moving speed specifying value recorded in the teaching point data when the robot is operated;

deceleration rate storage means for storing the straight portion deceleration rate set by the straight portion deceleration setting means and the inward turning portion deceleration rate set by the inward turning portion deceleration rate setting means into the teaching point data when the robot is operated;

moving speed resetting means for resetting moving speeds of the robot at a straight portion and an inward turning portion in accordance with the straight portion deceleration rate and the inward turning portion deceleration rate stored in the teaching point data, and if the teaching point data inputted from the change judgement means is teaching point data changed through calculation of the straight portion deceleration rate and the inward turning portion deceleration rate by the operation of the robot, resetting a speed in accordance with the straight portion deceleration rate and the inward turning portion deceleration rate stored in the teaching point data without newly calculating the straight line deceleration rate and the inward turning portion deceleration rate, when the robot is operated;

interpolation arithmetic means for executing interpolation arithmetic to a path specified by the teaching point data in accordance with the specified trajectory shape and the reset moving speeds, and outputting an angle change waveform of respective joint axes to operate the robot; and continuing means for smoothing an angle change of the respective joint axes of the robot when the tip portion passes through the teaching point, and generating a continuous curved line trajectory passing the inside of the teaching point in accordance with the allowable path error.

\* \* \* \* \*